US006933767B2

(12) United States Patent
Bucks et al.

(10) Patent No.: US 6,933,767 B2
(45) Date of Patent: Aug. 23, 2005

(54) CIRCUIT ARRANGEMENT

(75) Inventors: Marcel Johannes Maria Bucks, Eindhoven (NL); Johannes Mathcus Theodorus Lambertus Claessens, Best (NL); Jozef Petrus Emanuel De Krijger, Best (NL); Engbert Bernard Gerard Nijhof, Best (NL)

(73) Assignee: Lumileds Lighting U.S., LLC, San Jose, CA (US)

( * ) Notice: Subject to any disclaimer, the term of this patent is extended or adjusted under 35 U.S.C. 154(b) by 0 days.

(21) Appl. No.: 10/614,878

(22) Filed: Jul. 7, 2003

(65) Prior Publication Data

US 2004/0095185 A1 May 20, 2004

(30) Foreign Application Priority Data

Jul. 10, 2002 (EP) ........................................... 02077826

(51) Int. Cl.[7] ................................................ H02J 00/00

(52) U.S. Cl. ....................... 327/530; 363/71; 363/21.16

(58) Field of Search ................................ 327/530, 538, 327/108, 589, 172, 173, 174, 177, 181, 184; 363/71, 15, 21.12, 21.16, 21.15

(56) References Cited

U.S. PATENT DOCUMENTS

| | | | | | |
|---|---|---|---|---|---|
| 4,648,020 | A | * | 3/1987 | Vinciarelli | 363/71 |
| 4,683,529 | A | * | 7/1987 | Bucher, II | 363/44 |
| 5,235,502 | A | * | 8/1993 | Vinciarelli et al. | 363/20 |
| 6,487,097 | B2 | * | 11/2002 | Popescu | 363/56.09 |
| 6,597,155 | B2 | * | 7/2003 | Huang et al. | 323/222 |

* cited by examiner

*Primary Examiner*—Tuan T. Lam
*Assistant Examiner*—Hiep Nguyen
(74) *Attorney, Agent, or Firm*—Patent Law Group LLP

(57) ABSTRACT

In an up-converter feed forward control of the output current is effected by rendering the conduction time of the switching element proportional to $V_{out}/V_{in}^2$. This control is fast and avoids interference and loss of efficiency.

9 Claims, 3 Drawing Sheets

CIRCUIT ARRANGEMENT

BACKGROUND

1. Field of Invention

The invention relates to a circuit arrangement for supplying an LED array.

2. Description of Related Art

A circuit arrangement for supplying an LED array may include input terminals for connection to a voltage supply source, output terminals for connection to the LED array, and a DC—DC-converter coupled between the input terminals and the output terminals and equipped with an inductive element L, a unidirectional element, a switching element coupled to the inductive element and the unidirectional element, and a control circuit coupled to a control electrode of the switching element for generating a high frequency control signal for rendering the switching element conductive and non-conductive at a high frequency to thereby operate the DC—DC-converter in the critical discontinuous mode and equipped with means I for controlling the current through the output terminals at a predetermined value.

Operation in the critical discontinuous mode means that the current through the inductive element L equals zero at the beginning and at the end of each period of the control signal, while it differs from zero during each period of the control signal. This mode of operation ensures a high efficiency since power losses in the unidirectional element are prevented to a large extent. In the known converter the means I for controlling the current through the output terminals consist of a current control loop equipped with feedback. The actual value of the current is measured and compared with a desired value by means of a comparator that generates an error signal that in turn adjusts the control signal in such a way that the actual value of the current through the output terminals substantially equals the desired value. An advantage of such a control loop is that it allows a very accurate control of the value of the current. Disadvantages, however, are that the control loop is expensive since it comprises many components and that the control loop is comparatively slow. Furthermore, in case the actual value of the current is measured by measuring the voltage across an ohmic resistor that is placed in series with the output terminals, the control loop also causes a substantial power dissipation.

SUMMARY

Embodiments of the invention aim to provide a circuit arrangement comprising circuitry for controlling the output current, wherein the disadvantages mentioned above are absent.

In accordance with embodiments of the invention, a circuit arrangement for supplying an LED array may include input terminals for connection to a voltage supply source, output terminals for connection to the LED array, and a DC—DC-converter coupled between the input terminals and the output terminals and equipped with an inductive element L, a unidirectional element, a switching element coupled to the inductive element and the unidirectional element, and a control circuit coupled to a control electrode of the switching element for generating a high frequency control signal for rendering the switching element conductive and non-conductive at a high frequency to thereby operate the DC—DC-converter in the critical discontinuous mode and equipped with circuitry I for controlling the current through the output terminals at a predetermined value.

Circuitry I is coupled to the input terminals and the output terminals for controlling the time lapse $T_{on}$, during which the switching element is maintained in a conductive state during each high frequency period of the control signal, proportional to a mathematical expression that is a function of $V_{in}$ and $V_{out}$, wherein $V_{in}$ is the voltage present between the input terminals and $V_{out}$ is the voltage present between the output terminals.

Circuitry I in a circuit arrangement according to embodiments of the invention can be realized in a comparatively simple and inexpensive way. It has been found that the circuitry I counteracts changes in the input or output voltage of the circuit arrangement relatively fast and controls the current through the output terminals at a substantially constant level. Circuitry I in a circuit arrangement according to embodiments of the invention also do not dissipate a substantial amount of power.

DC—DC-converters of different types can be used in a circuit arrangement according to embodiments of the present invention. Good results have been obtained in case the DC—DC-converter is an up-converter and circuitry I controls $T_{on}$ proportional to $V_{out}/V_{in}^2$. Similarly, the DC—DC-converter can be implemented as a down-converter while circuitry I controls $T_{on}$ proportional to $V_{out}/((V_{out}-V_{in})^2$ Good results have also been obtained in case the DC—DC-converter is a flyback-converter that comprises a transformer with a transformation ratio N and circuitry I controls $T_{on}$ proportional to $(V_{in}+V_{out}/N)/V_{in}^{2.}$ Good results have been obtained for embodiments of a circuit arrangement according to the invention, wherein circuitry I comprises a current source that generates a current that is proportional to $V_{in}^2$. Such a current source can be realized in a simple and dependable way, in case the current source comprises a first voltage divider coupled to the input terminals, a first zener diode coupled to the first voltage divider and a switching element coupled to the first zener diode. In a preferred embodiment the current source comprises a second zener diode. The second zener diode allows circuitry I to render $T_{on}$ proportional to $1/V_{in}^2$ for two different values of the input voltage (e.g. 12 V and 24 V). In addition to the current source, the control circuit preferably comprises a capacitor coupled to the current source, and a comparator equipped with a first comparator input terminal coupled to the capacitor, a second comparator input terminal coupled to an output terminal of a second voltage divider coupled to the output terminals of the circuit arrangement, and a comparator output terminal coupled to the control electrode of the switching element.

In case it is desirable to control the light output of the LED array operated by a circuit arrangement according to embodiments of the invention, the control circuit is preferably equipped with circuitry III for substantially square wave modulating the amplitude of the current through the output terminals. Circuitry III switches the current through the LEDs off during part of each period of the modulation and on during the remaining part. By adjusting the time lapse in each period of the modulation during which the LEDs carry a current, the light output of the LEDs can be adjusted. It is observed that circuitry III can be incorporated in the control circuit since the feed forward control of $I_{out}$ by circuitry I in a circuit arrangement according to embodiments of the invention is comparatively fast. In most known circuit arrangements equipped with a current control loop comprising feedback, circuitry III cannot be comprised in the control circuit since the control loop is too slow. In some embodiments, circuitry for modulating is realized in the form of a "chopper" that usually comprises a (semiconductor) switch and drive circuitry for driving the switch. The switch realizes the modulation by "chopping" the output current of the circuit arrangement. Such a chopper is comparatively expensive, generates interference and decreases the efficiency of the circuit arrangement for instance by hard switching. Furthermore, it is often necessary to take care of for instance interference shielding and dampening, increasing the costs and the complexity of the circuit arrangement even further. The fast control of the output current realized by circuitry I comprised in a circuit arrangement according to embodiments of the present invention allows the modulation of the output current to be effected by circuitry III that is part of the control circuit. As a consequence circuitry III is comparatively cheap, does not cause interference and does not lower the efficiency of the circuit arrangement.

BRIEF DESCRIPTION OF THE DRAWINGS

Embodiments of the invention will be described making reference to a drawing. In the drawings.

DETAILED DESCRIPTION

Figure 1:
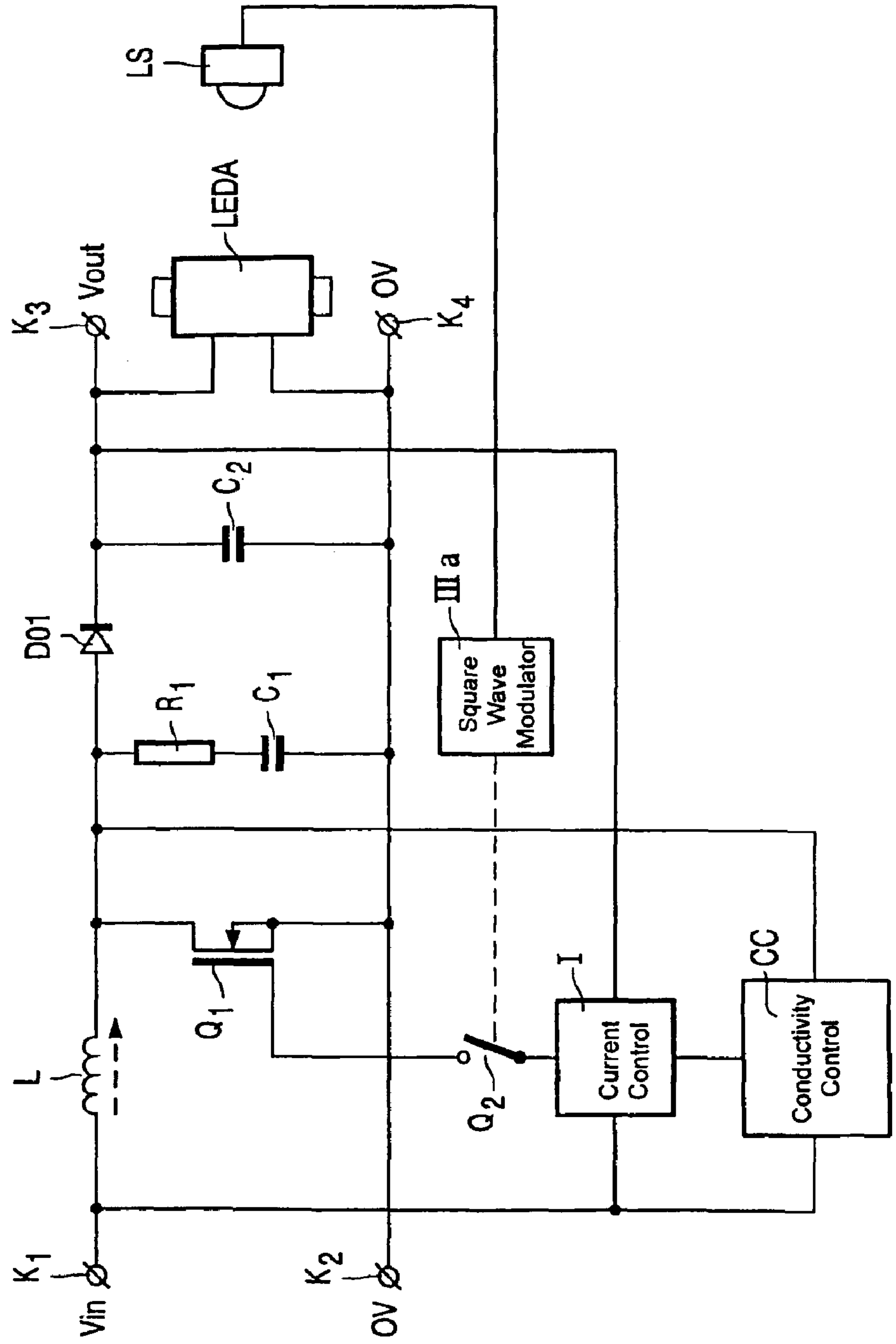
FIG. 1 shows an embodiment of a circuit arrangement according to the invention with a LED array connected to it and comprising a DC—DC-converter of the up-converter type.

In FIG. 1, K1 and K2 are input terminals for connection to a voltage supply source. Input terminals K1 and K2 are connected by means of a series arrangement of inductive element L and switching element Q1. Switching element Q1 is shunted by a series arrangement of ohmic resistor R1 and capacitor C1 and by a series arrangement of diode D1 and capacitor C2. In this embodiment diode D1 forms a unidirectional element. Respective sides of capacitor C2 are connected with output terminal K3 and output terminal K4. An LED array LEDA is connected between output terminals K3 and K4. A control electrode of switching element Q1 is connected to an output terminal of circuit part I via a switching element Q2. Circuit part I forms circuitry I for controlling the current through output terminals K3 and K4 at a predetermined value. Respective input terminals of circuit part I are connected to input terminal K1, output terminal K3 and an output terminal of a circuit part CC. Circuit part CC is a circuit part for controlling when the switching element Q1 needs to be rendered conductive. Respective input terminals of the circuit part CC are connected to input terminal K1 and a common terminal of inductive element L and switching element Q1. A control electrode of switching element Q2 is coupled to an output terminal of circuit part IIIa. In FIG. 1 this is indicated by means of a dotted line. An input terminal of circuit part IIIa is coupled to a light sensor LS. The light sensor LS, the circuit part III*a* and the switching element Q2 together form circuitry III for substantially square wave modulating the amplitude of the current through the output terminals. Inductive element L, switching element Q1, capacitors C1 and C2, ohmic resistor R1, diode D1, light sensor LS, circuit parts IIIa, CC and I and switching element Q2 together form a DC—DC-converter of the up-converter type. The light sensor LS, the circuit parts IIIa, CC, I and the switching element Q2 together form a control circuit for generating a high frequency control signal for rendering the switching element Q1 conductive and non-conductive at a high frequency to thereby operate the DC—DC-converter in the critical discontinuous mode.

The operation of the circuit arrangement shown in FIG. 1 is as follows.

When input terminals K1 and K2 are connected to a supply voltage source and circuit part IIIa controls switching element Q2 in a conductive state, the control circuit renders the switching element Q1 conductive and non-conductive at a high frequency in such a way that the DC—DC-converter is operated in the critical discontinuous mode. As pointed out hereabove this means that the amplitude of the current through the inductive element is substantially zero at the beginning and at the end of each period of the control signal. As a result, a DC current flows through the output terminals K3 and K4 and the LED array LEDA emits light.

The control circuit controls the switching in the following way. Because of the presence of capacitor C1 (and the parasitic capacitor that is part of switching element Q1), the direction of the current through the inductive element L changes polarity for a very short time lapse at the end of each period of the control signal. As a consequence a current with a very small amplitude flows from the capacitor C1 in the direction of the input terminal K1. This causes the common terminal of switching element Q1 and the inductive element L to be at a higher potential than input terminal K1. Circuit part CC detects this situation and activates circuit part I that renders switching element Q1 conductive and maintains switching element Q1 conductive during a time lapse Ton that is proportional to $V_{out}/V_{in}^2$, wherein $V_{in}$ is the voltage that is present between the input terminals and $V_{out}$ is the voltage between the output terminals. During $T_{on}$ the current through inductive element L increases linearly to a value $I_{peak}$. For the value of $I_{peak}$ the following equation is valid:

$$I_{peak}=V_{in}\cdot T_{on}/L_o,$$

wherein $L_o$ is the inductivity of inductive element L.

At the end of the time lapse $T_{on}$ the switching element Q1 is rendered nonconductive by circuit part I. During the remaining part of the period of the control signal the amplitude of the current through inductive element L decreases linearly to substantially zero. As a consequence the shape of the current through inductive element L is triangular and the average value of the current through inductive element L in each period of the control signal therefore equals $I_{peak}/2$. It follows that for the power Pin that is consumed by the DC—DC-converter the following equation holds:

$$P_{in}=V_{in}\cdot I_{peak}/2.$$

When it is assumed that the voltage conversion by the DC—DC-converter is taking place without losses, the power supplied by the DC—DC-converter ($V_{out}\cdot I_{out}$) to the LED array equals the power consumed by the DC—DC-converter:

$$V_{in}\cdot I_{peak}/2=V_{out}\cdot I_{out},$$

wherein $I_{out}$ is the current flowing through the output terminals K3 and K4.

From the above equations the next equation can easily be derived:

$$T_{on}=I_{out}\cdot 2\cdot L_o\cdot V_{out}/V_{in}^2.$$

From this latter equation it can be seen that the current $I_{out}$ can be maintained at a constant value, in case the time lapse $T_{on}$ is controlled at a value that is proportional to $V_{out}/V_{in}^2$. As a consequence the output current $I_{out}$ of the circuit arrangement shown in FIG. 1 remains substantially unchanged, when the input voltage $V_{in}$ or the output voltage $V_{out}$ changes.

Figure 3:
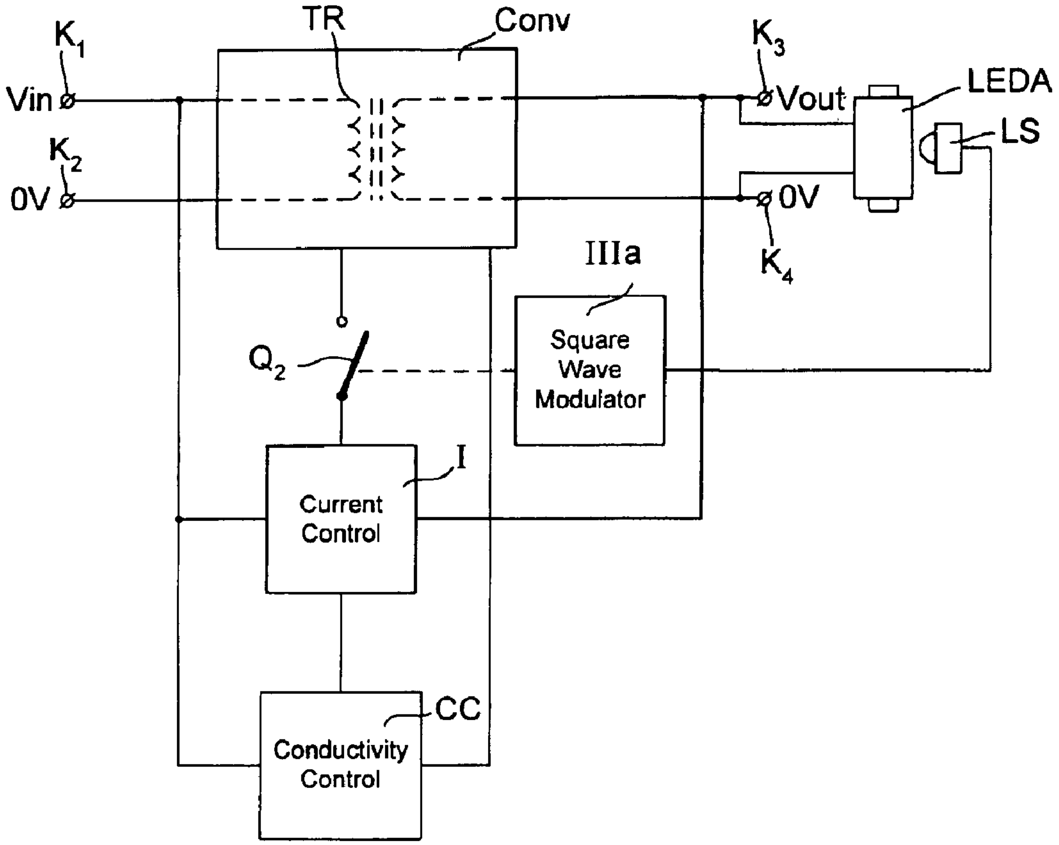
FIG. 3 shows an embodiment of a circuit arrangement according to the invention with a LED array connected to it and comprising a DC—DC-converter.

DC—DC-converters of different types can be used in a circuit arrangement according to embodiments of the present invention. For example, as illustrated in FIG. 3, which is similar to FIG. 1, the DC—DC-converter, illustrated as box Conv, can be implemented as a down-converter while circuitry I controls $T_{on}$ proportional to $V_{out}/((V_{out}-V_{in})^2$. Good results have also been obtained in case the DC—DC-converter Conv is a flyback-converter that comprises a transformer TR with a transformation ratio N and circuitry 1 controls $T_{on}$ proportional to $(V_{in}+V_{out}/N)/V_{in}^2$. The transformer TR is illustrated in FIG. 3 with broken lines as the transformer may not be used with all converters.

During operation switching element Q2 is switched on and off at a much lower frequency than the frequency of the control signal that controls switching element Q1. During the part of the modulation period in which switching element Q2 is non-conductive the amplitude of the current $I_{out}$ through the output terminals is zero. As a result, the amplitude of the current $I_{out}$ through the output terminals is substantially square wave modulated. The light output of the LED array is monitored by the light sensor LS and a signal representing the average value of that light output is generated by circuit part IIIa. In circuit part IIIa this value is compared with a reference signal that is also generated by circuit part III*a* and represents the desired average value of the light output. The duty cycle of the signal controlling the conductive state of switching element Q2, or in other words the duty cycle of the modulation of the output current amplitude, is adjusted in accordance with the outcome of the comparison. As a result, the average value of the light output is controlled at a substantially constant level. It is noted that when switching element Q2 is rendered conductive (in each period of the modulation), the feed forward control of the output current effected by circuit part I is fast enough to make sure that the amplitude of $I_{out}$ increases from substantially zero to a constant value in a comparatively short time. Unlike a much slower control loop incorporating current feedback, it is this fast control that allows the circuitry III for modulating the amplitude of $I_{out}$ to be part of the control circuit so that a “chopper” causing interference and decreased efficiency can be dispensed with.

Figure 2:
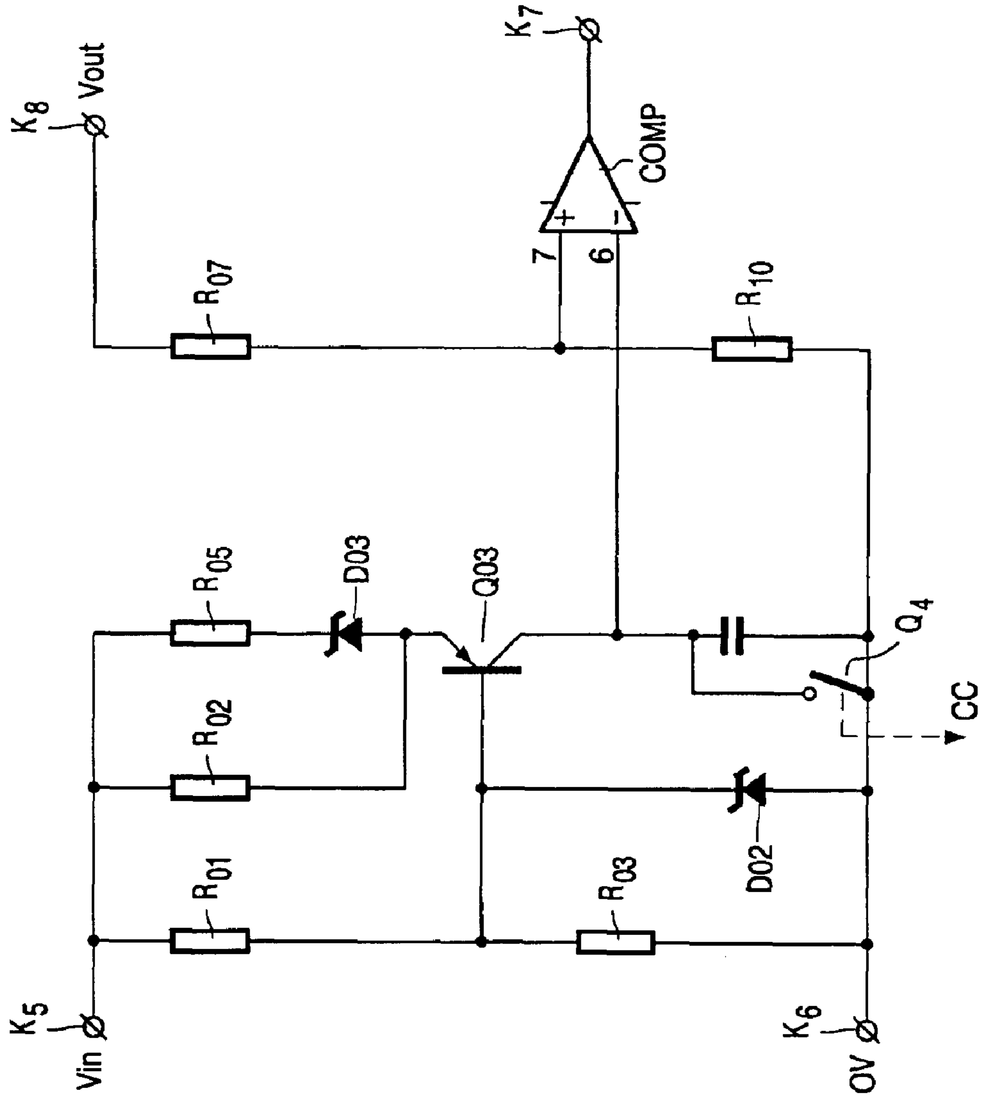
FIG. 2 shows part of the embodiment shown in FIG. 1 in more detail.

FIG. 2 shows circuit part I of the embodiment shown in FIG. 1 in more detail. In FIG. 2, K5 is a terminal that is connected to input terminal K1 and K6 is a terminal that is connected to input terminal K2, so that during operation the voltage $V_{in}$ is present between terminals K5 and K6. Terminals K5 and K6 are connected by means of a series arrangement of ohmic resistor R1 and R3 and by means of a series arrangement of ohmic resistor R5, zener diode D3, transistor Q3 and capacitor C3. Ohmic resistor R3 is shunted by zener diode D2. A common terminal of ohmic resistor R3 and zener diode D2 is connected to a basis electrode of transistor Q3. Terminal K5 is connected to an emitter electrode of transistor Q3 by means of ohmic resistor R2. Capacitor C3 is shunted by a switching element Q4. A control electrode of switching element Q4 is connected to the output terminal of circuit part CC. Ohmic resistors R1, R2, R3 and R5, zener diodes D2 and D3 and transistor Q3 are so dimensioned that together they form a current source that is dimensioned to supply a current that is proportional to $V_{in}^2$. Terminal K8 is connected to output terminal K3. Terminal K8 is also connected to terminal K6 by means of a series arrangement of ohmic resistors R7 and R10. During operation the voltage $V_{out}$ is present across this series arrangement. A common terminal of ohmic resistor R7 and ohmic resistor R10 is connected to a first input terminal of comparator COMP. A common terminal of transistor Q3 and capacitor C3 is connected to a second input terminal of comparator COMP. K7 is a comparator output terminal that is coupled to the control electrode of switching element Q1.

The operation of the circuit part I shown in FIG. 2 is as follows.

When the circuit part CC detects that the switching element Q1 needs to become conductive, the voltage at its output terminal changes from low to high and switching element Q4 is rendered conductive so that capacitor C3 is discharged. As a result the voltage present at the second input terminal of the comparator COMP becomes lower than the voltage present at the first input terminal of the comparator, so that the voltage present at the comparator output terminal K7 becomes high and switching element Q1 is rendered conductive. As soon as capacitor C3 is discharged switching element Q4 is rendered non-conductive again and the current source supplying a current that is proportional to $V_{in}^2$ charges capacitor C3. As long as the voltage over capacitor C3 is lower than the voltage at the first input terminal of the comparator COMP, the voltage at the comparator output terminal is high and switching element Q1 is maintained in a conductive state. The voltage at the output comparator terminal becomes low and therefore the switching element Q1 becomes non-conductive, when the voltage across capacitor C3 becomes equal to the voltage at the first input terminal of the comparator COMP. Since the current charging capacitor C3 is proportional to $V_{in}^2$ and the voltage at the first input terminal is proportional to $V_{out}$, it follows that $T_{on}$ is proportional to $V_{out}/V_{in}^2$. The current source is designed in such a way that is suitable for use with two different values of $V_{in}$, such as 12 V and 24 V. At the lowest value of the two different values of $V_{in}$, only zener diode D2 and not zener diode D3 is conductive. As a consequence the current supplied by the current source is the current through ohmic resistor R2. At the highest of the two different values of $V_{in}$, both zener diodes are conducting and the current supplied by the current source is the sum of the currents through ohmic resistors R2 and R5.

It is noteworthy to observe that the current source in circuit part I in FIG. 2 is so designed that the current it supplies is proportional to $V_{in}^2$ only to a good approximation and not exactly. Furthermore, $V_{in}$ is often supplied by a battery and therefore will only vary over a limited range. As a consequence it is only necessary for the current source to supply a current that is approximately proportional to $V_{in}^2$, for values of $V_{in}$ that differ not too much (for instance only 10% or 20% at most) from the average value of $V_{in}$. In case for instance the current source is designed for an average value of $V_{in}$ that equals 12 V, it is in most practical cases completely satisfactory when the current source supplies a current that is approximately proportional to $V_{in}^2$ for values of $V_{in}$ within the range $10.8V<V_{in}<13.2V$. Similarly, in case the current source is designed for two different average values of $V_{in}$ such as 12V and 24 V, satisfactory results are obtained when the current source only supplies a current that is approximately proportional to $V_{in}^2$, for values of $V_{in}$ for instance within the range $10.8V<V_{in}<13.2V$ and for values of $V_{in}$ for instance within the range $21.6V<V_{in}<26.4V$.

In a practical embodiment of the circuitry shown in FIG. 1 and FIG. 2 it was found that a variation by 10% of $V_{in}$ caused the output current $I_{out}$ to change by less than 3%. Similarly a variation by 20% of $V_{in}$ caused the output current $I_{out}$ to change by less than 5%. In case circuitry I would be absent, or in other words in case the $T_{on}$ of switching element Q1 would remain unchanged, a 10% variation in the input voltage $V_{in}$ would lead to a 20% change in the output current, while a 20% variation in the input voltage $V_{in}$ would lead to a 40% change in the output current $I_{out}$.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A circuit arrangement for supplying an LED array comprising:

input terminals for connection to a voltage supply source;

output terminals for connection to the LED array;

a DC—DC-converter coupled between the input terminals and the output terminals, the DC—DC-converter comprising:

an inductive element L;

a unidirectional element;

a switching element coupled to the inductive element and the unidirectional element; and a control circuit coupled to a control electrode of the switching element for generating a high frequency control signal for rendering the switching element conductive and non-conductive at a high frequency to thereby operate the DC—DC-converter in the critical discontinuous mode and equipped with circuitry for controlling the current through the output terminals at a predetermined value, the circuitry for controlling the current through the output terminals comprising:

a circuit coupled to the input terminals and the output terminals for controlling a time lapse $T_{on}$, during which the switching element is maintained in a conductive state during each high frequency period of the control signal, proportional to a mathematical expression that is a function of $V_{in}$ and $V_{out}$, wherein $V_{in}$ is the voltage present between the input terminals and $V_{out}$ is the voltage present between the output terminals;

wherein the DC—DC-converter is an up-converter and the circuit comprises a circuit for controlling $T_{on}$ proportional to $V_{out}/V_{in}^2$.

2. A circuit arrangement for supplying an LED array comprising:

input terminals for connection to a voltage supply source;

output terminals for connection to the LED array;

a DC—DC-converter coupled between the input terminals and the output terminals, the DC—DC-converter comprising:

an inductive element L;

a unidirectional element;

a switching element coupled to the inductive element and the unidirectional element; and a control circuit coupled to a control electrode of the switching element for generating a high frequency control signal for rendering the switching element conductive and non-conductive at a high frequency to thereby operate the DC—DC-converter in the critical discontinuous mode and equipped with circuitry for controlling the current through the output terminals at a predetermined value, the circuitry for controlling the current through the output terminals comprising:

a circuit coupled to the input terminals and the output terminals for controlling a time lapse $T_{on}$, during which the switching element is maintained in a conductive state during each high frequency period of the control signal, proportional to a mathematical expression that is a function of $V_{in}$ and $V_{out}$, wherein $V_{in}$ is the voltage present between the input terminals and $V_{out}$, is the voltage present between the output terminals;

wherein the DC—DC-converter is a down-converter and the circuit comprises a circuit for controlling $T_{on}$ proportional to $V_{out}/((V_{out}-V_{in})^2$.

3. A circuit arrangement for supplying an LED array comprising:

input terminals for connection to a voltage supply source;

output terminals for connection to the LED array;

a DC—DC-converter coupled between the input terminals and the output terminals, the DC—DC-converter comprising:

an inductive element L;

a unidirectional element;

a switching element coupled to the inductive element and the unidirectional element; and a control circuit coupled to a control electrode of the switching element for generating a high frequency control signal for rendering the switching element conductive and non-conductive at a high frequency to thereby operate the DC—DC-converter in the critical discontinuous mode and equipped with circuitry for controlling the current through the output terminals at a predetermined value, the circuitry for controlling the current through the output terminals comprising:

a circuit coupled to the input terminals and the output terminals for controlling a time lapse $T_{on}$, during which the switching element is maintained in a conductive state during each high frequency period of the control signal, proportional to a mathematical expression that is a function of $V_{in}$ and $V_{out}$, wherein $V_{in}$ is the voltage present between the input terminals and $V_{out}$ is the voltage present between the output terminals;

wherein the DC—DC-converter is a flyback-converter comprising a transformer with a transformation ratio N and the circuit comprises a circuit for controlling $T_{on}$ proportional to $(V_{in}+V_{out}/N)/V_{in}^2$.

4. A circuit arrangement for supplying an LED array comprising:

input terminals for connection to a voltage supply source;

output terminals for connection to the LED array;

a DC—DC-converter coupled between the input terminals and the output terminals, the DC—DC-converter comprising:

an inductive element L;

a unidirectional element;

a switching element coupled to the inductive element and the unidirectional element; and a control circuit coupled to a control electrode of the switching element for generating a high frequency control signal for rendering the switching element conductive and non-conductive at a high frequency to thereby operate the DC—DC-converter in the critical discontinuous mode and equipped with circuitry for controlling the current through the output terminals at a predetermined value, the circuitry for controlling the current through the output terminals comprising:

a circuit coupled to the input terminals and the output terminals for controlling a time lapse $T_{on}$, during which the switching element is maintained in a conductive state during each high frequency period of the control signal, proportional to a mathematical expression that is a function of $V_{in}$ and $V_{out}$, wherein $V_{in}$ is the voltage present between the input terminals and $V_{out}$ is the voltage present between the output terminals;

wherein the circuit comprises a current source that generates a current that is proportional to $V_{in}^2$.

5. A circuit arrangement as claimed in claim 4, wherein the current source comprises a first voltage divider coupled to the input terminals, a first zener diode coupled to the first voltage divider and a switching element coupled to the first zener diode.

6. A circuit arrangement as claimed in claim 5, wherein the current source comprises a second zener diode.

7. A circuit arrangement as claimed in claim 4, wherein the circuit further comprises:

a capacitor coupled to the current source; and a comparator, comprising:

a first comparator input terminal coupled to the capacitor, a second comparator input terminal coupled to an output terminal of a second voltage divider coupled to the output terminals of the circuit arrangement, and a comparator output terminal coupled to the control electrode of the switching element.

8. A circuit arrangement as claimed in claim 4, wherein the control circuit is equipped with circuitry for substantially square wave modulating the amplitude of the current through the output terminals.

9. A Liquid Crystal Display unit equipped with a backlight formed by a LED array and with a circuit arrangement as claimed in claim 4.

* * * * *

UNITED STATES PATENT AND TRADEMARK OFFICE

CERTIFICATE OF CORRECTION

PATENT NO. : 6,933,767 B2

DATED : August 23, 2005

INVENTOR(S) : Bucks et al.

It is certified that error appears in the above-identified patent and that said Letters Patent is hereby corrected as shown below:

Title page,

Item [75], Inventors, change "Mathcus" to -- Matheus --.

Signed and Sealed this

Seventeenth Day of January, 2006

JON W. DUDAS

*Director of the United States Patent and Trademark Office*